(12) United States Patent
Sennett

(10) Patent No.: US 10,092,017 B2
(45) Date of Patent: Oct. 9, 2018

(54) CHEESE CAVE

(71) Applicant: Jessica Sennett, Brooklyn, NY (US)

(72) Inventor: Jessica Sennett, Brooklyn, NY (US)

( * ) Notice: Subject to any disclaimer, the term of this patent is extended or adjusted under 35 U.S.C. 154(b) by 0 days.

(21) Appl. No.: 14/844,969

(22) Filed: Sep. 3, 2015

(65) Prior Publication Data

US 2017/0013854 A1    Jan. 19, 2017

Related U.S. Application Data

(60) Provisional application No. 62/045,006, filed on Sep. 3, 2014.

(51) Int. Cl.
*A23B 7/148* (2006.01)
*A23C 19/097* (2006.01)
*A23B 4/16* (2006.01)
*A23B 5/10* (2006.01)

(52) U.S. Cl.
CPC .......... *A23C 19/097* (2013.01); *A23B 7/148* (2013.01); *A23B 4/16* (2013.01); *A23B 5/10* (2013.01)

(58) Field of Classification Search
CPC .......... A23B 7/144; A23B 7/148; A23B 5/10; A23B 4/16
USPC .......... 99/467, 473, 474, 476; 312/128, 132, 312/236; 219/214, 401
See application file for complete search history.

(56) References Cited

U.S. PATENT DOCUMENTS

| | | | | |
|---|---|---|---|---|
| 3,906,849 A | * | 9/1975 | Williams | A47J 37/06 126/299 R |
| 4,039,776 A | * | 8/1977 | Roderick | A21B 1/10 126/21 A |
| 4,850,480 A | * | 7/1989 | Kawaguchi | B65D 81/22 206/205 |
| 5,519,188 A | * | 5/1996 | Yuichi | A01K 41/00 219/398 |
| 5,918,954 A | * | 7/1999 | Papadakis | A47F 1/126 312/126 |
| 6,121,583 A | * | 9/2000 | Hansen | A21B 3/04 126/20 |
| 7,700,894 B2 | * | 4/2010 | Quella | A47F 3/001 126/21 A |
| D670,973 S | | 11/2012 | Piacenza | |

* cited by examiner

*Primary Examiner* — Reginald L Alexander
(74) *Attorney, Agent, or Firm* — Zak Shusterman

(57) ABSTRACT

A cheese cave with adjustable shelves for storing cheeses and improving cheese quality by maintaining preferable temperature and humidity levels, air exchange levels, and air circulation levels, using a water soaked block and a plurality of selectively adjustable ventilation holes. The number and positions of shelves are adjusted to accommodate cheeses of different sizes and also creates different regions allowing the maintenance of multiple microclimates within the cheese cave.

10 Claims, 6 Drawing Sheets

CHEESE CAVE

CROSS-REFERENCE TO RELATED APPLICATIONS

This application claims the benefit of Applicant's prior provisional application, No. 62/045,006, filed on Sep. 3, 2014.

STATEMENT REGARDING FEDERALLY SPONSORED RESEARCH OR DEVELOPMENT

Not applicable.

REFERENCE TO COMPACT DISC APPENDIX

Not applicable.

BACKGROUND OF INVENTION

Field of the Invention

The present invention relates generally to food storage. More particularly, this invention relates to a novel cheese cave for maintaining and improving cheeses stored therein.

Background of the Related Art

The production and consumption of cheeses has been rising dramatically. As consumer access to and appreciation of both domestically produced and imported fine cheeses grows, consumers also discover that the quality of a fine cheese may degrade rapidly from the time it is purchased. This degradation in quality is due, in part, to the conditions under which cheese is stored. The packaging materials in which cheeses are sold are often not ideal for storage of the types of cheeses they contain. Additionally, a combination of factors, including but not limited to relative humidity, air flow, temperature, handling, container size, and container shape, affect the rate of degradation in the quality of a cheese. Beyond maintaining a cheese's quality, proper conditions may allow cheese to continue to improve, referred to as "ripening".

One conventional method for storing cheese is to simply place it on a refrigerator shelf or in a refrigerator drawer wrapped in plastic, wax paper, or cheese paper. While this solution may have some success at maintaining the temperature at which a cheese is stored, different types of cheeses require varying permutations of conditions to maintain quality. A refrigerator's standard temperature setting would be appropriate for only a limited range of fresh cheeses. This temperature setting will have detrimental effects on the quality of many other fresh cheeses, as well as many aged cheeses. In addition, this solution fails to control any of the many other factors that may affect cheese quality, such as oxidation, suffocation, ammonification, excessive drying and cracking, and off flavors.

Another obstacle to proper storage of cheese is maintaining optimal levels of relative humidity. A relative humidity of 70-99% is ideal for cheeses. While a closed refrigerator theoretically may be capable of maintaining a steady level of humidity, the reality that a refrigerator door will be opened and closed numerous times during the course of a day results in drastic fluctuations in relative humidity that will detrimentally impact cheese quality. While the more confined environment of a refrigerator drawer mitigates such fluctuations in relative humidity, it does not eliminate them, and is often too aerated by harsh fridge air. Furthermore, different cheeses have different optimal relative humidity levels. Even where a refrigerator drawer is capable of maintaining a relative humidity level, the particular relative humidity level maintained within that refrigerator drawer would not be appropriate for a large number of cheeses that would be stored therein, especially if these cheeses are stacked on top of each other, trapping moisture between them. Therefore, it remains desirable to provide a solution that is capable of storing and ripening cheeses at varying optimal conditions, without the need for extra packaging.

Another problem encountered in the storage of cheeses is that certain cheeses require some minimum amount of handling and breathability, referred to as "maintenance". One example of maintenance involves periodically inverting the cheese to ensure that all sides of the ripening cheese are exposed to the air. Another example is preserving ample space between cheeses so that they do not develop off flavors or altered textures due to excess pressure. Accordingly, it remains desirable to provide a solution that creates and maintains microclimates uniquely suited to storing and improving each individual cheese placed inside.

A further problem encountered in the storage of cheeses is that, where cheese is stored along side other products, accessing these other products results in frequent exposure of the cheeses to sunlight. Sunlight has a detrimental effect on the quality of stored cheese and results in cheese degradation.

It is, therefore, an object of this invention to provide a cheese cave capable of controlling and maintaining the factors that contribute to cheese quality. Another object of this invention is to provide a cheese cave capable of providing a range of conditions to match the storage requirements of different cheeses, stored as both cut wedges and whole wheels of cheese, without the need for additional packaging. A further object of this invention is to provide a cheese cave that maintains optimal cheese storage conditions while avoiding excess exposure to sunlight.

SUMMARY OF INVENTION

Accordingly, the present invention contemplates a new and improved cheese cave. The invention eliminates the above-discussed and other drawbacks of the currently employed methods of cheese storage.

The invention solves the problem of creating conditions beneficial to maintaining and improving cheese quality by providing an assembly that reduces the fluctuation of factors affecting cheese quality. The problem of maintaining temperatures appropriate to different cheeses is solved by providing a cheese cave scalable to a range of sizes. A smaller size implementation of the cheese cave is capable of being placed, alternatively, in a refrigerator, on a counter, or in any other area or container appropriate to the temperature desired to be maintained as determined by the cheeses being stored therein. A mid-sized implementation is capable of storing a modest sampling of cheeses simultaneously. A larger implementation is capable of storing a large selection of multiple cheeses simultaneously.

The invention solves the problem of changing any inappropriate humidity levels by providing a cheese cave that includes a means for maintaining beneficial humidity levels. Humidity is further regulated by providing a closed system that is capable of maintaining appropriate humidity levels while perforations and natural permeation of air at imperfectly sealed edges prevent the development of excessive humidity by allowing for the escape of moisture. Humidity is also regulated by providing a cheese cave with a vaulted ceiling that provides additional air volume within the cheese cave and directs any condensate that forms on the ceiling away from any cheese located below it.

Humidity is further regulated by providing a cheese cave with an electronic means of setting and maintaining desired relative humidity levels. Humidity is additionally controlled by providing a container made of permeable materials capable of absorbing excess humidity in the internal environment, as well as absorbing condensation that may form on inner surfaces. Temperature is regulated by providing a cheese cave with an electronic means of setting and maintaining desired storage temperature.

Cave air exchange circulates air at a low, gentle rate from the top and bottom of the cave, as well as gently expelling ammoniated air for fresh outside supply. There are varying air renewal rates and air movement rates dependent upon the cheeses being aged. For small to medium models, a simple, passive ventilation system will suffice. Cool air will enter through the lower compartment of ventilation holes and warmer air will be released through the higher compartments of ventilation holes. For larger models, ventilation supports such as fans for air circulation and internal pipe attachments that help distribute fresh air will aid in even air distribution.

In one embodiment, a cheese cave is provided with four walls, wherein one wall is a removable panel functioning as a door, a top piece, a bottom piece, and a plurality of shelves.

In another embodiment, a cheese cave is provided with four walls, wherein one wall is a sliding door, a top piece, a bottom piece, and a plurality of shelves.

In yet another embodiment, a cheese cave is provided with one or more transparent panels, a top piece, a bottom piece, and a plurality of shelves.

In another embodiment, a cheese cave is provided with top and bottom pieces having a plurality of perforations, and a plurality of selectively adjustable shelves, the shelves having a plurality of perforations.

In an additional embodiment, a cheese cave is provided with non-transparent walls of permeable nature.

In a further embodiment, a cheese cave is provided that is composed of air and water permeable materials.

In still another embodiment, a cheese cave is provided with a vaulted top piece that is concave on its interior side and a concave bottom piece. Having a concave surface serves multiple purposes. The concavity provides an additional volume of air that facilitates the regulation of humidity. Further, in circumstances in which the humidity within the cheese cave rises to the point where condensation begins to form, the concave surfaces will direct any condensate that forms on the upper interior surface to slide along the surface of the concavity such that condensate will drip away from any cheese centered below the concavity or continue sliding down along the interior of the walls.

In a further embodiment, a cheese cave is provided with a plurality of perforations in its walls.

In additional embodiments, a cheese cave is be provided in a range of sizes to permit storage of larger portions of cheese, a greater number of portions of cheese, or to allow extra space for circulation of air around cheese stored therein.

In yet another embodiment, a cheese cave is provided with one or more of its shelves having one or more recesses at their edges permitting the limited exchange of air above and below the shelf.

In still another embodiment, a cheese cave is provided with a water permeable block to maintain humidity.

In an additional embodiment, a cheese cave is provided with one or more adjustable vents to control the circulation of air between the interior and exterior of the cheese cave.

In another embodiment, a cheese cave is provided with a humidity control component comprimising a sensor capable of detecting humidity levels within the cheese cave and a means of adjusting humidity levels within the cheese cave In a further embodiment, a cheese cave is provided that controls relative humidity levels by opening or closing air vents to achieve desired levels.

In another embodiment, a cheese cave is provided with a temperature control component comprising a sensor capable of detecting temperature levels within the cheese cave and a means of adjusting temperature levels within the cheese cave.

BRIEF DESCRIPTION OF DRAWINGS

The invention may take physical form in certain parts and arrangements of parts, a preferred embodiment of which will be described in detail in this specification. Other objects and advantages of the invention will become apparent upon reading the following detailed description and upon reference to the accompanying drawing, in which.

DETAILED DESCRIPTION OF INVENTION

Figure 1:
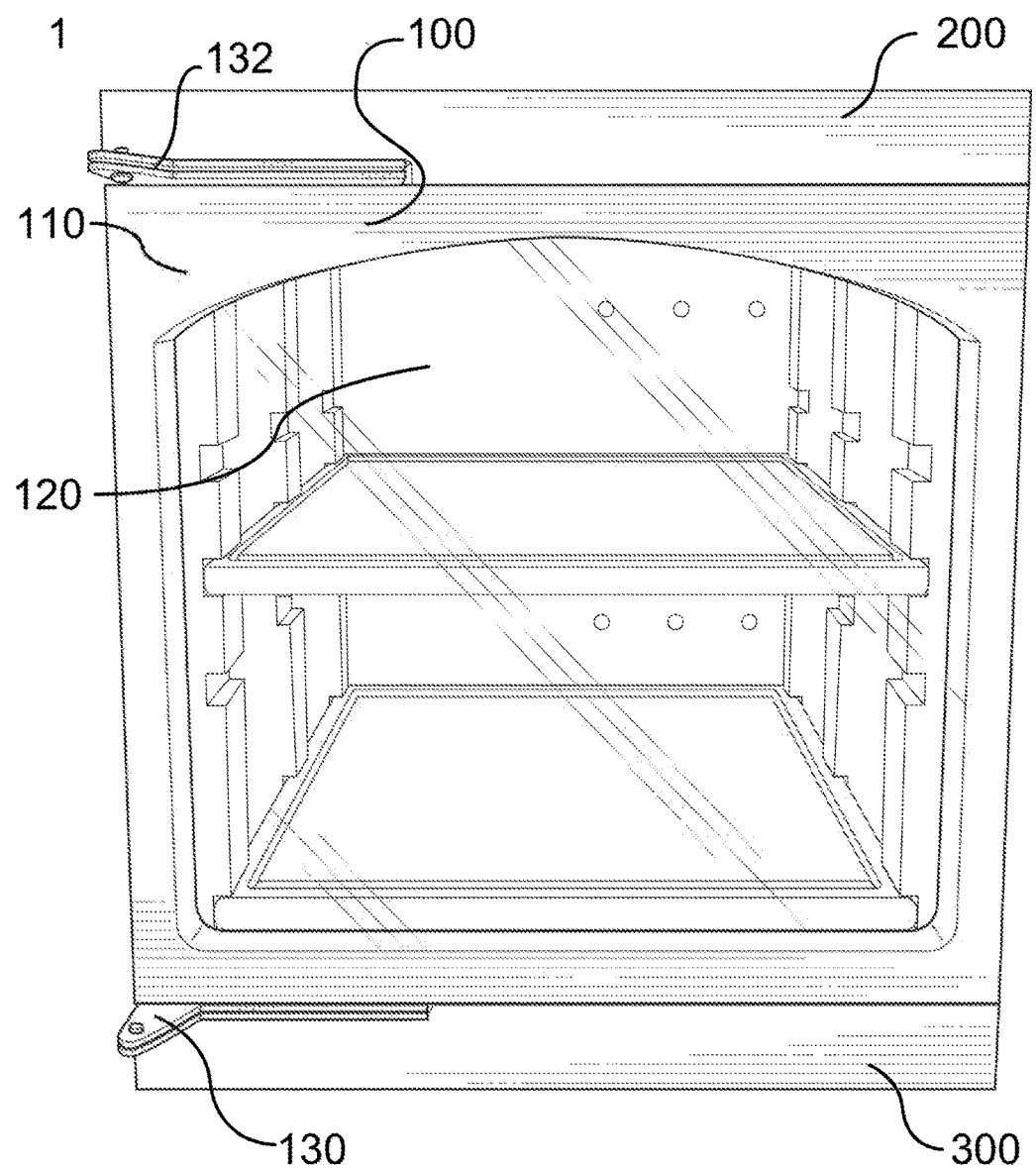
FIG. 1 is a front view of an embodiment of a cheese cave, with door closed, in accordance with the invention.

While the invention is susceptible to various modifications and alternative forms, specific embodiments thereof have been shown by way of example in the drawings that are herein described in detail. It should be understood, however, that the description herein to specific embodiments is not intended to limit the invention to the particular forms disclosed, but on the contrary, the intention is to cover all modifications, equivalents, and alternatives falling within the spirit and scope of the invention. It will of course be appreciated that in the development of any such actual embodiment, numerous decisions specific to any particular implementation must be made to achieve the developers' goals, which will vary from one implementation to another. In the interest of clarity, not all features of an actual implementation are described in this specification. Moreover, it will be appreciated that such development effort might be complex and time-consuming, but would nevertheless be a routine undertaking for those of ordinary skill in the art having the benefit of this disclosure.

FIG. 1 is a front view of an embodiment of a cheese cave 1, with door 100 closed, in accordance with the invention. Door 100 is comprised of Door Frame 110 and Panel 120. Panel 120 is transparent to allow viewing of the interior of cheese cave 1. Door 100 is attached to top piece 200 and bottom piece 300 by hinges 130. When closed, Door 100 forms a seal across the opening of cheese cave 1.

Figure 2:
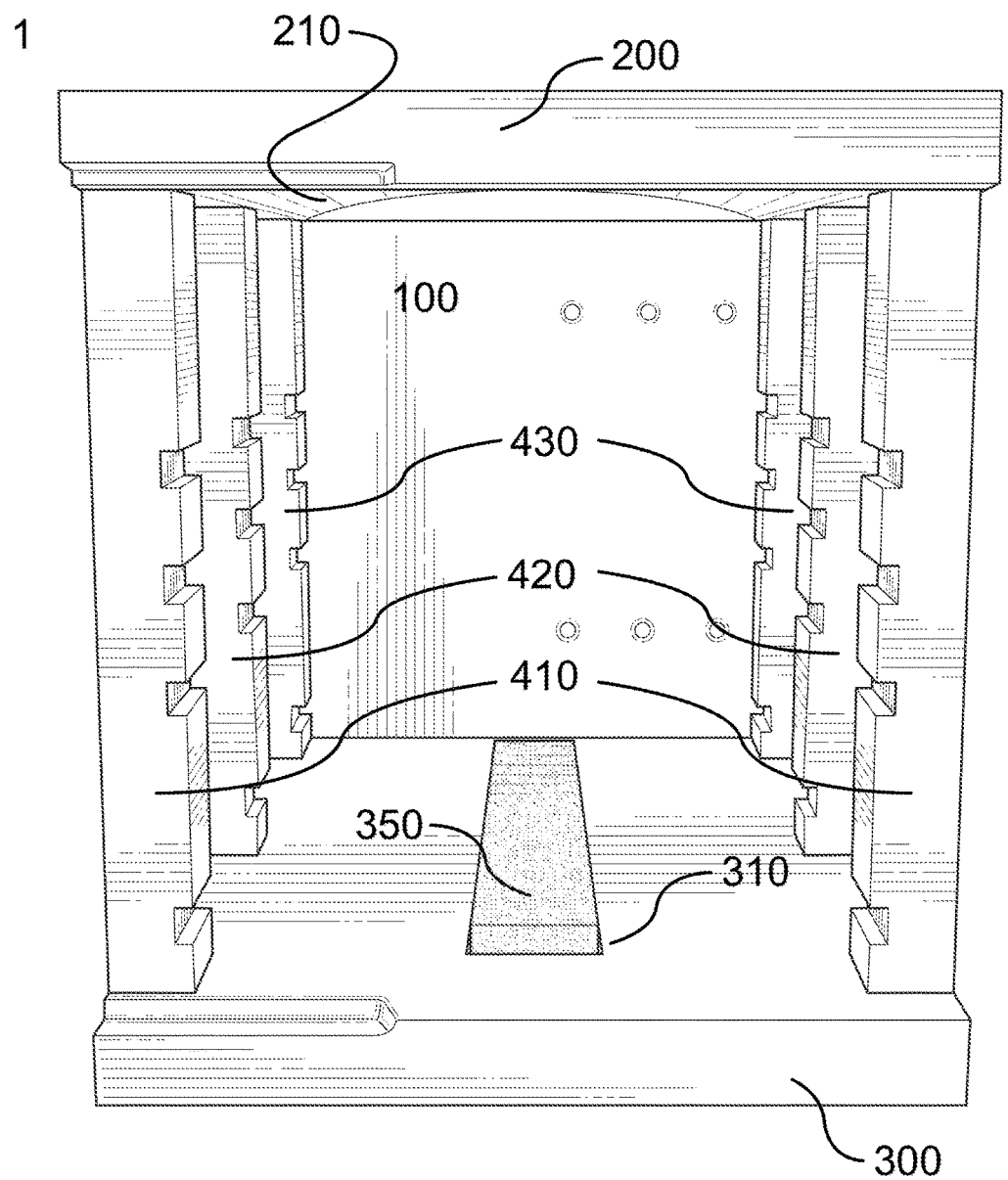
FIG. 2 is a front view of the cheese cave of FIG. 1, with door and shelves removed.

FIG. 2 is a front view of cheese cave 1, with no door. Side supports 410 and 420 are fixedly secured to top piece 200 and to bottom piece 300.

Rearmost side supports 430 are fixedly secured to top piece 200, to bottom piece 300, and to rear wall 400. Side panels 450 are fixedly secured between side supports 410, 420, and 430. Side panels 450 are transparent to allow viewing of the interior of cheese cave 1. Alternatively, side panels 450 may be of a non-transparent nature to provide a darker environment that is beneficial to cheese maintenance. Non-transparent side panels may further consist of a permeable material, such as natural bamboo, that absorbs some humidity from the environment within cheese cave 1 and releases it to the exterior.

Top piece 200 has a concave interior surface. The concavity provides an additional volume of air that facilitates the regulation of humidity. Further, in circumstances in which the relative humidity within the cheese cave rises to match absolute humidity—a condition known as the dew point—condensations will occur. The concave surfaces will direct any condensate that forms on the interior surface of top piece 200 to slide toward the periphery of the concavity such that condensate will drip away from any cheese centered below the concavity or continue sliding down along the interior of panels 450. The permeability of top piece 200 will cause it to absorb excess moisture and impede condensate dripping.

Bottom piece 300 has a recess 310. Humidifier block 350 rests in recess 310. Humidifier block 350 is composed of a non-vitreous or semi-vitreous material that is water permeable. In preparation for use, humidifier block 350 would be charged by sitting in a water bath, allowing it to absorb water. Once charged, humidifier block 350 would then be placed into recess 310 from which it would naturally release moisture into the air in the interior of cheese cave 1, thereby naturally initially increasing and then maintaining increased humidity levels therein.

Figure 3:
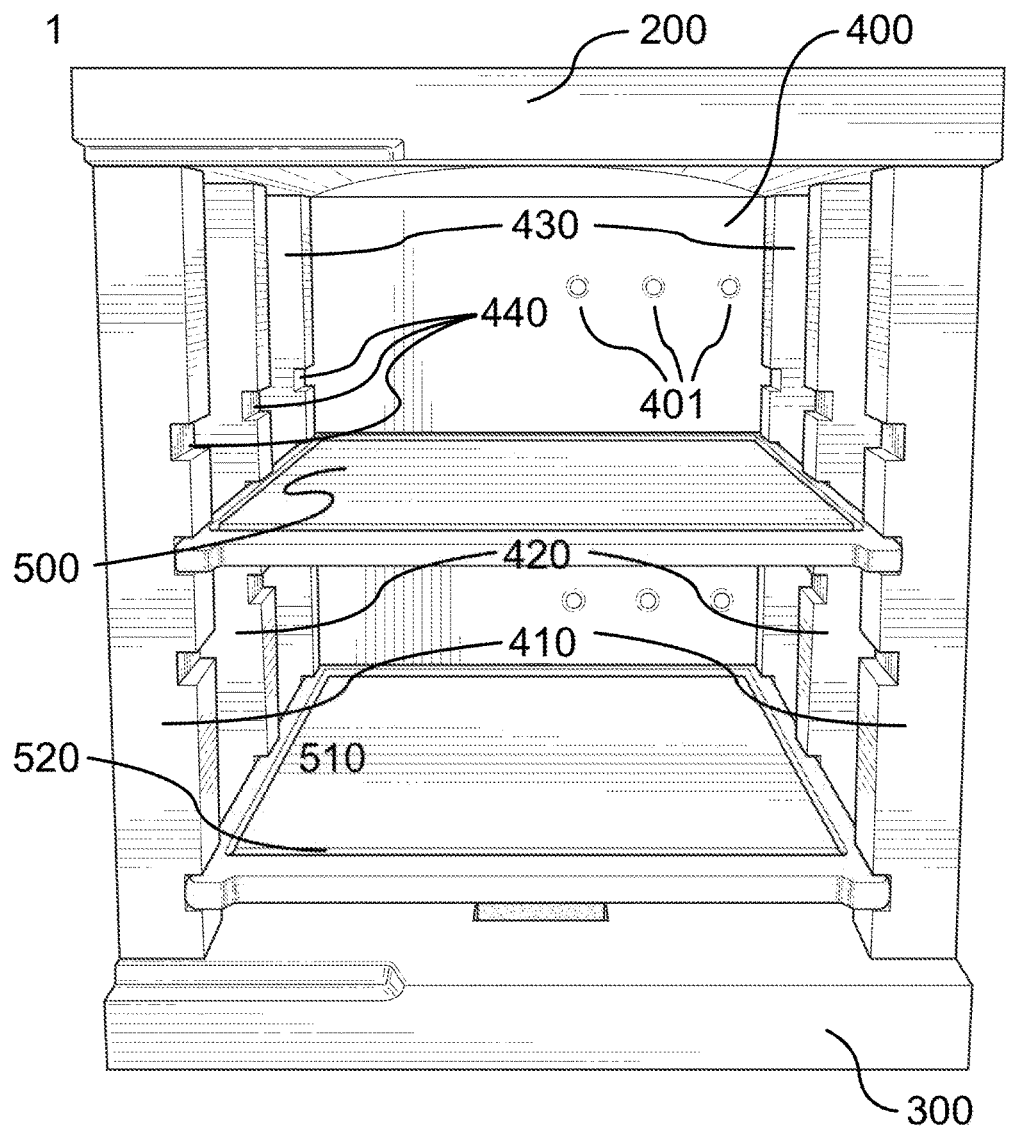
FIG. 3 is a front view of the cheese cave of FIG. 1, with door removed and two shelves positioned.

FIG. 3 is a front view of cheese cave 1. Side supports 410, 420, and 430 have sets of aligned slots 440, each set capable of supporting a shelf 500. One or more shelves 500 are selectively inserted into a set of aligned slots 440 from the anterior of cheese cave 1. Shelves 500 have a recessed front edge 501 and a recessed rear edge 502. These recessed edges permit the exchange of air above and below shelves 500.

Shelves 500 are composed of a water permeable material. Shelves 500 will absorb a cheese's excess moisture. Shelves 500 have a top surface 510 with a drip trough 520 around the periphery of top surface 510 to capture any moisture released by cheeses resting on shelf 500 or condensate dripping down from the concave inner surface of top piece 200. Reducing the moisture of a cheese keeps the cheese fresher for longer periods and increases the intervals between routine flipping of the cheese that is necessary to control moisture accumulation.

A plurality of shelves 500 may be inserted into respective sets of aligned slots 440. Preferably, where one large portion of cheese is to be stored, a single shelf 500 would be inserted into the lowermost aligned slots 440 providing the largest single storage volume. Each additional shelf 500 inserted into a set of aligned slots 440 provides an additional surface for storing cheeses. The insertion of additional shelves 500 divides the interior of cheese cave 1 into separate smaller volumes. The insertion of addition shelves 500 also results in the creation of varying micro-environments. The volume of space above each successively higher shelf 500 would be successively farther from humidifier block 350 and possess a lower relative humidity than the volume below it.

Rear wall 400 includes a plurality of vent holes 410.

Figure 4:
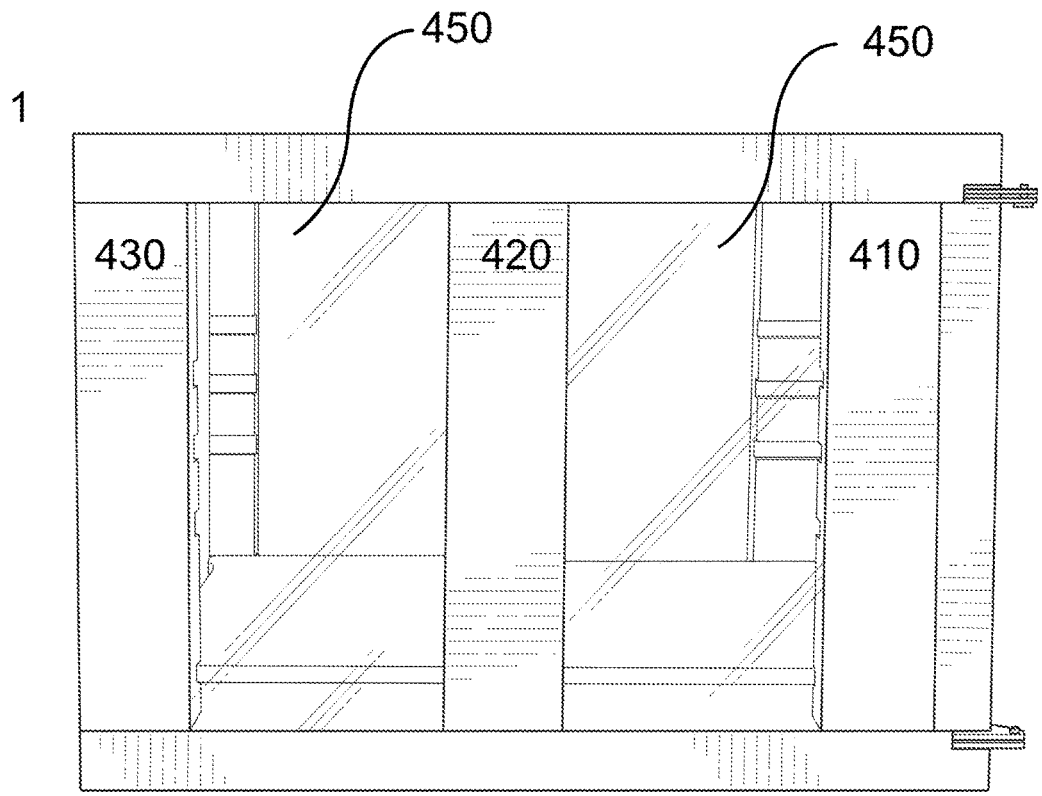
FIG. 4 is a side view of the cheese cave of FIG. 1, with only one shelf positioned.

FIG. 4 is a side view of cheese cave 1.

Figure 5:
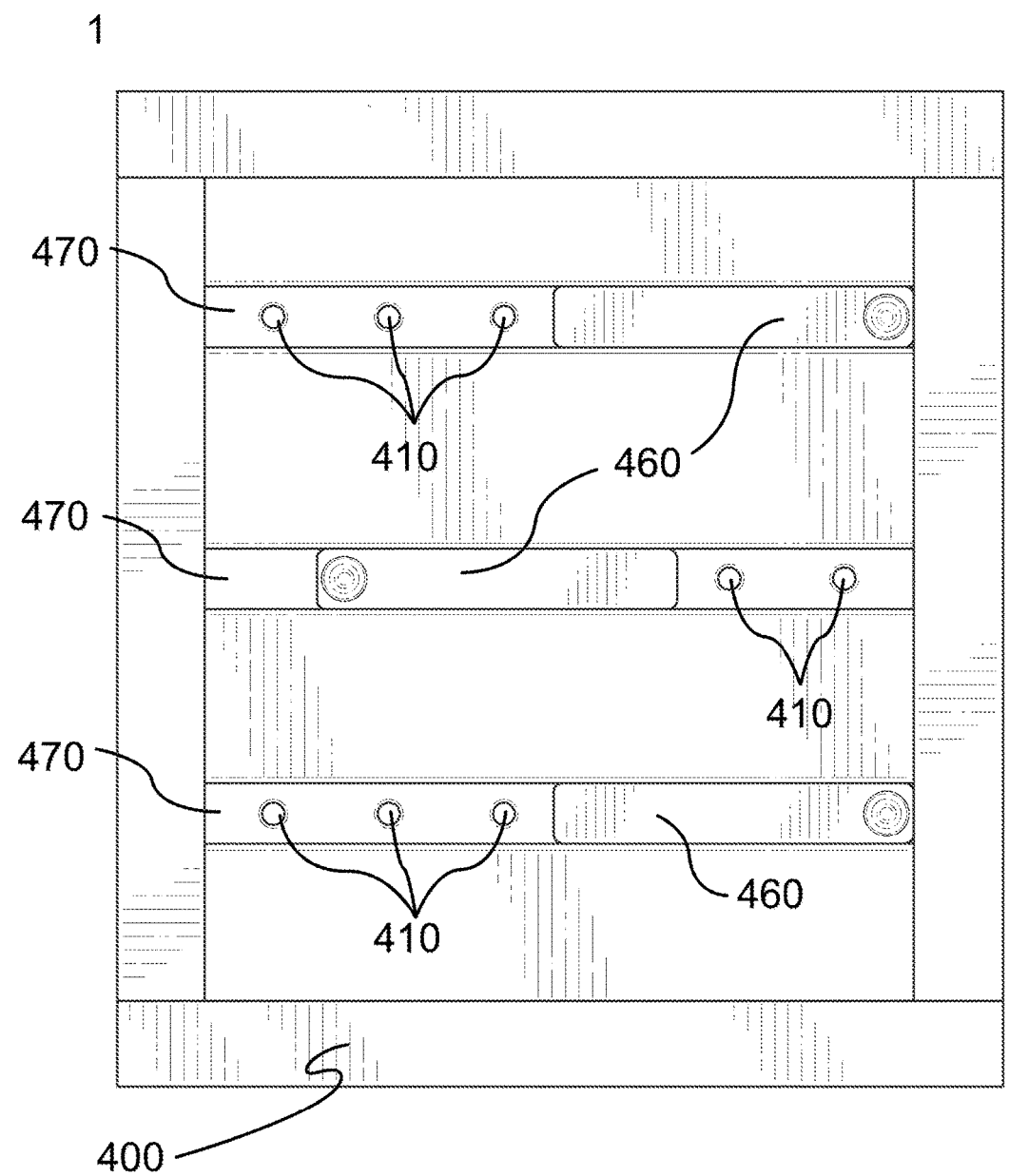
FIG. 5 is a rear view of the cheese cave of FIG. 1.

FIG. 5 is a rear view of cheese cave 1. Rear wall 400 includes a plurality of vent holes 410 in channels 470. A control gate 460 rests in each channel 470. Control gate 460 may be moved along channels 470 to expose additional or fewer vent holes 410. Each channel 470 may correspond to a separate smaller volume defined by inserting a shelf 500. The relative humidity of a particular smaller volume may be further adjusted by operating control gate 460 and thereby exposing more or fewer vent holes 410.

Figure 6:
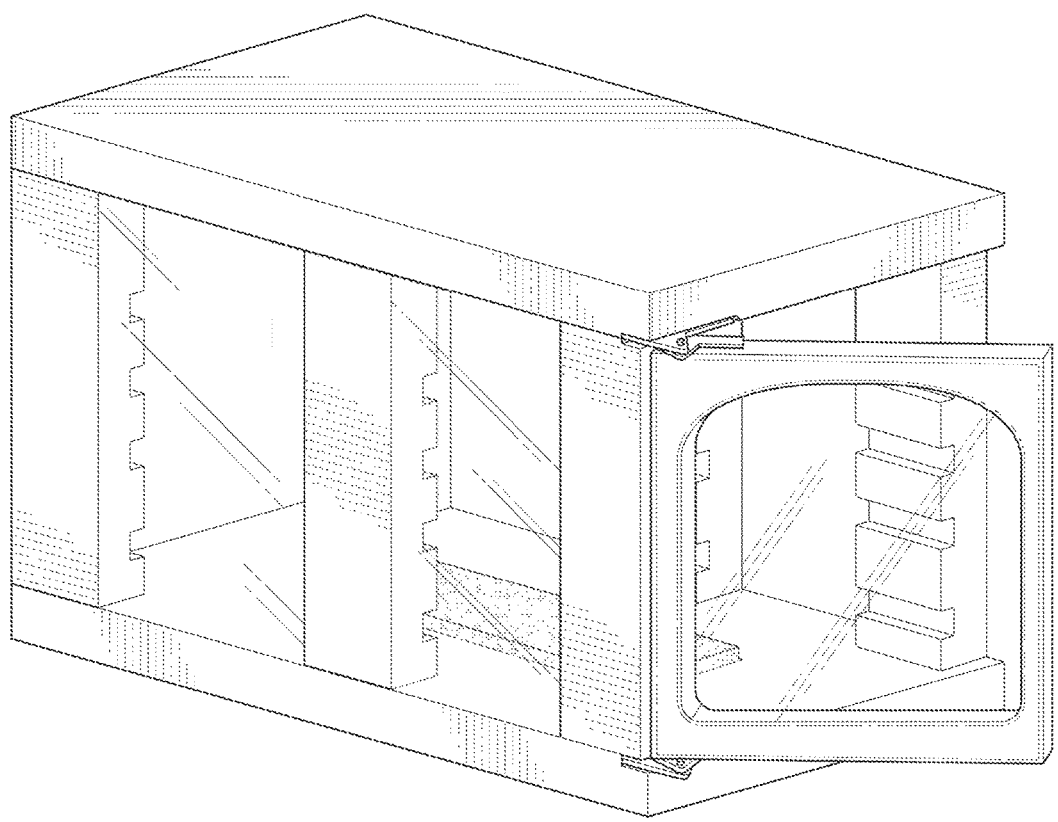
FIG. 6 is a front perspective view of the cheese cave of FIG. 1.

FIG. 6 is a front perspective view of cheese cave 1.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

Although very narrow claims are presented herein, it should be recognized the scope of this invention is much broader than presented by the claims. It is intended that broader claims will be submitted in an application that claims the benefit of priority from this application.

The invention claimed is:

1. A cheese cave assembly comprising:
   a container comprised of a first side wall and a second side wall,
   said side walls fixedly attached to a bottom piece, a top piece, and a rear wall, a plurality of shelves said container having an anterior opening,
   said side pieces having a plurality of supporting members aligned so as to support one or more shelves
   a door operationally attached to the anterior opening of said container, said shelves having a recessed front edge and a recessed rear edge, said recesses spanning the thickness of the shelf, and further comprising a top surface with a trough around the periphery of said top surface,
   a humidifier block composed of water absorbing matter resting in the recess of the bottom piece,
   said rear wall further comprising a plurality of vent holes, said vent holes further comprising a mesh material securely affixed to said vent holes, and
   a means of selectively closing said vent holes.

2. A cheese cave assembly as set forth in claim 1 wherein:
   said rear wall further comprises a plurality of channels, each said channel containing a gate, said gates being operationally secured within each channel and having vent holes aligned with said channels.

3. A cheese cave assembly as set forth in claim 2 further comprising:
   an electrical humidity control regulating the ambient humidity levels within the cheese cave, air exchange, and air circulation, and an electrical temperature control regulating the temperature within the cheese cave.

4. A cheese cave assembly as set forth in claim 3 further comprising:
   a means of air exchange comprised of one or more ventilation fans, said fans secured to one or more pipe attachments, said pipe attachments extending into the inner volume of the cheese cave.

5. A cheese cave assembly comprising:
   a container comprised of a first side wall and a second side wall, a top piece, and a rear wall, said side walls fixedly attached to a bottom piece, said first side wall further comprises a plurality of supporting members, said second side wall further comprises a plurality of supporting members, said supporting members aligned so as to support one or more shelves, said rear wall further comprises a plurality of vent holes and a means of selectively opening and closing said vent holes, said container having an anterior opening, a door operationally attached to the anterior opening of said container, a humidifier block composed of water absorbing matter resting on the bottom piece, and a plurality of shelves, said shelves being removable and capable of being inserted into the container such that a shelf may be supported by any one of the plurality of matched supporting members, and said shelves further comprise a top surface, said top surface having a trough around the periphery of said top surface.

6. A cheese cave assembly as set forth in claim 5, wherein:
said shelves have a front edge and a rear edge, said edges having a recess spanning the thickness of the shelf, and
wherein the bottom piece further comprises a recess in which the humidifier block rests.

7. A cheese cave assembly as set forth in claim 6, wherein:
said rear wall further comprises a means for selectively obstructing the vent holes, and
said vent holes further comprising a mesh material securely affixed to the vent holes.

8. A cheese cave assembly as set forth in claim 7, wherein:
said means for selectively obstructing the vent holes comprises a plurality of channels in said rear wall, each said channel containing a gate, said gates being operationally secured within each channel, and
wherein the vent holes are aligned with the channels.

9. A cheese cave assembly as set forth in claim 8 further comprising:
an electrical humidity control regulating the ambient humidity levels, air circulation, and air exchange within the cheese cave, and an electrical temperature control regulating the temperature within the cheese cave.

10. A cheese cave assembly as set forth in claim 9 further comprising:
a means of air exchange comprised of one or more ventilation fans, said fans secured to one or more pipe attachments, said pipe attachments extending into the inner volume of the cheese cave.

* * * * *